(12) United States Patent
Tarquini et al.

(10) Patent No.: US 7,991,901 B2
(45) Date of Patent: Aug. 2, 2011

(54) METHOD AND SYSTEM FOR CHARACTERIZATION OF ONLINE BEHAVIOR

(75) Inventors: Maureen Mendick Tarquini, Cary, NC (US); Michael Chad Robertson, Raleigh, NC (US); Robert Asheville Sandefur, Jr., Chapel Hill, NC (US)

(73) Assignee: Hitwise Pty, Ltd., Melbourne (AU)

( * ) Notice: Subject to any disclaimer, the term of this patent is extended or adjusted under 35 U.S.C. 154(b) by 137 days.

(21) Appl. No.: 12/415,992

(22) Filed: Mar. 31, 2009
(Under 37 CFR 1.47)

(65) Prior Publication Data
US 2009/0265461 A1    Oct. 22, 2009

Related U.S. Application Data

(63) Continuation of application No. 10/251,621, filed on Sep. 20, 2002, now Pat. No. 7,533,179.

(60) Provisional application No. 60/323,798, filed on Sep. 20, 2001.

(51) Int. Cl.
*G06F 15/16* (2006.01)
(52) U.S. Cl. ........................................ 709/228; 709/229
(58) Field of Classification Search .................. 709/228, 709/229
See application file for complete search history.

(56) References Cited

U.S. PATENT DOCUMENTS

| 5,053,956 A | 10/1991 | Donald et al. |
|---|---|---|
| 5,991,735 A | 11/1999 | Gerace |
| 6,018,619 A | 1/2000 | Allard et al. |
| 6,151,601 A | 11/2000 | Papierniak et al. |
| 6,448,980 B1 * | 9/2002 | Kumar et al. ................. 715/745 |
| 6,792,458 B1 | 9/2004 | Muret et al. |
| 6,804,701 B2 * | 10/2004 | Muret et al. ................. 709/203 |
| 6,976,056 B1 | 12/2005 | Kumar |
| 6,983,379 B1 | 1/2006 | Spalink et al. |
| 6,987,734 B2 * | 1/2006 | Hundemer .................... 370/237 |
| 7,028,001 B1 * | 4/2006 | Muthuswamy et al. ... 705/14.73 |
| 7,346,703 B2 | 3/2008 | Cope |
| 2002/0007415 A1 * | 1/2002 | Douglis et al. ................ 709/230 |

(Continued)

FOREIGN PATENT DOCUMENTS

| GB | 2 346 229 | 2/2000 |
|---|---|---|
| WO | WO 00/57611 | 9/2000 |
| WO | WO 01/25896 | 4/2001 |

OTHER PUBLICATIONS

PCT/IB 02/05540, Supplemental European Search Report, Oct. 21, 2004.

(Continued)

*Primary Examiner* — Kenny S Lin
(74) *Attorney, Agent, or Firm* — Knobbe, Martens, Olson and Bear, LLP

(57) ABSTRACT

Data about computer network traffic is collected as user website visit recording sessions. The data captured is analyzed and organized with sufficient level of detail or granularity to determine a single request from a server. Each data request is analyzed to determine if it comes from a server with which an ongoing end user interaction or open site visit is occurring. If not, a new site visit is created as a general proposition. If the data request is part of an open site visit, then the time is compared to the time of the last interaction and if the interval is sufficiently small, the data request is treated as a continuation of the visit. If the interval is large, a new site visit is created.

18 Claims, 1 Drawing Sheet

U.S. PATENT DOCUMENTS

2002/0116354 A1* 8/2002 Baudu et al. .................... 706/47

OTHER PUBLICATIONS

Web Pages printed Nov. 2, 2004 of Internet Draft entitled "Tunneling SSL Through a WWW Proxy", Luotonen, Ari, Netscape Communications Corporation (Dec. 14, 1995); 4 pages. http://muffin.doit.org/docs/rfc/tunneling.sub.--ssl.html.

Sax, Michael M., "Data Collection and Privacy Protection : An International Perspective", Presentation: Managing Online Risk and Liability Conference, Aug. 31, 1999 (58 pages).

* cited by examiner

METHOD AND SYSTEM FOR CHARACTERIZATION OF ONLINE BEHAVIOR

CROSS REFERENCE TO RELATED APPLICATIONS

This application is a continuation of and claims priority to U.S. patent application Ser. No. 10/251,621, filed Sep. 20, 2002 now U.S. Pat. No. 7,533,179. This application is also related to and claims priority to U.S. Provisional Application Ser. No. 60/323,798, filed Sep. 20, 2001, the disclosure of which is expressly incorporated herein by reference for all purposes.

BACKGROUND OF THE INVENTION

1. Field of the Invention

This invention relates to a method and system for collecting and classifying computer network traffic, particularly Internet traffic. Specifically, the method and system of the invention characterize the interaction between users and web sites to facilitate construction of more accurate online behavior profiles for marketing purposes.

2. Discussion of the Background

The Internet has rapidly grown into a center for conducting commerce with unprecedented efficiency and commercial advantage; however, the Internet also presents numerous new challenges to the development and execution of appropriate business models and processes. To design and implement effective marketing and business plans, companies need to gain a better understanding of consumer behavior and preferences while they are conducting Internet commerce.

Behavior profiles are created using network usage data collected through various methods. Once the data is collected, it is analyzed to determine the behavior of a particular user. In order to create an accurate behavior profile, it is useful to generalize Internet usage by identifying the types of Web sites a particular type of user accesses and the way that type of user accesses a particular type of Web site.

For example, it would be valuable to a merchant to know that users from a geographical area regularly purchase books from a merchant with a website, for example, Amazon.com™. However, there is a need for more generalized data, than that which is specific to a particular merchant. It is desirable to have a system that can create what are known as "generalized behavior profiles." By generalized behavior profile is meant a collection of data that describes the attributes and usage patterns of online shoppers, but does not contain personally identifiable information of such online shoppers. More specifically, it is valuable to know that users in a particular geographical area regularly conduct electronic commerce by accessing online catalog and shopping sites by following links on a Web portal site.

To build accurate generalized behavior profiles, it is desirable to know typical behaviors and actions that lead up to a purchase. For example, it would be desirable to know that many users searched one online merchant site for books to purchase and then went to a different online merchant site to make the actual purchase. For the specific merchant whose site was used for browsing, this information indicates that the site is successful in attracting potential shoppers, but perhaps prices need to be more competitive to retain those initially coming to the site. More generally, this information may indicate that price is a factor which overrides factors such as convenience and functionality of a website in the decisions of similar consumers.

SUMMARY OF THE INVENTION

In accordance with the invention, a method and system are provided for collecting and characterizing computer network traffic data. All data captured is analyzed and organized with sufficient level of detail (or granularity) to determine a single request from a server (e.g. a single .gif file on a web site). As one of ordinary skill in the art will appreciate, there are many methods for organizing data to achieve this level of detail. Each data request is analyzed to determine if it comes from a server with which an ongoing end user interaction (or open site visit) is occurring. If not, generally a new site visit is created. If the data request is part of an open site visit, then the time is compared to the time of the last interaction with that site. If the interval is sufficiently small, then the data request is generally treated as a continuation of that open site visit. If the interval is sufficiently large, a new site visit is created.

DETAILED DESCRIPTION OF THE INVENTION

Figure 1:
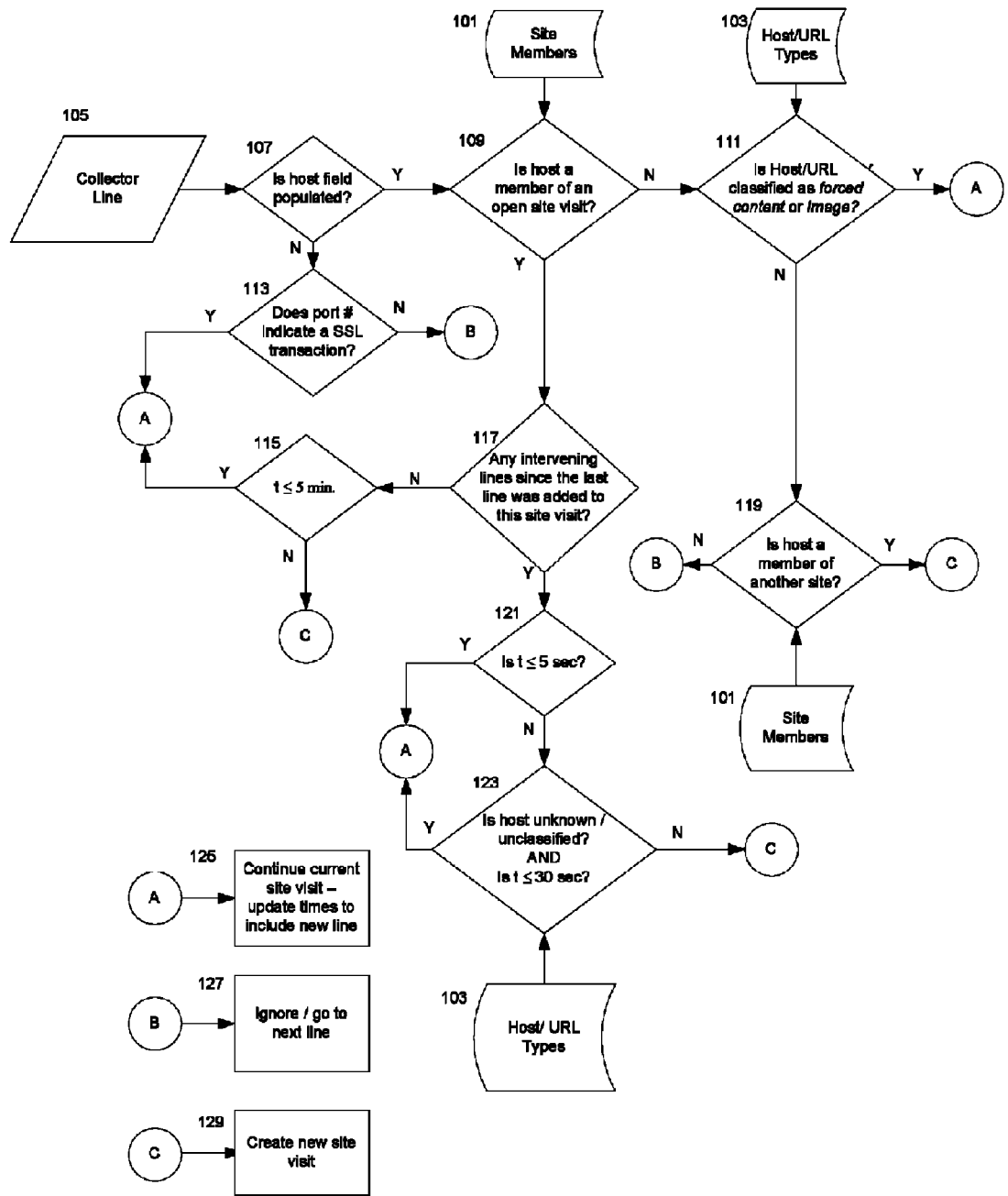
FIG. 1 is a basic flow chart of the method to characterize computer network traffic data.

In a step 101, a data table that contains all known hosts (the part of the URL path name that precedes the backslash) that direct a user to a particular location (site) is established. This is referred to as the Site Members Table. By way of example, let us consider the merchant known as Barnes and Noble. In the case of Barnes and Noble, the following hosts are all members of the Barnes and Noble site: www.bn.com, www.barnesandnoble.com, music.barnesandnoble.com, shop.barnesandnoble.com, and 207.36.92.145. By compiling a table containing all hosts which are members of the Barnes and Noble site, this allows the capture of unique users, visits, and the calculation of visit durations for the Barnes and Noble site regardless of what host is entered or how the user navigates on the site.

To calculate durations accurately, the logic of the method and system must also have a capability for handling components (ads, images, etc.) of a Web site coming from servers (hosts) that are not members of a given site. An additional data table is compiled in step 103, and contains hosts that are classified as "forced content" (e.g. ads, or banners, or counters). Further, URL content types that are classified as images (e.g. .gif, .jpg, etc.) are also compiled into this data table in step 103. This data table is referred to as the Host/URL Types Table.

For example, the host ads.ebay.com is an advertisement, and may appear in the datastream, and thereby suggest a visit to the merchant known as eBay, when a user is actually visiting the merchant using the URL amazon.com. The method and system must recognize that although that host is not a member of the current site, it is a component of that site visit to the merchant known as Amazon, and may also appear on many other sites. The logic underlying the method and system therefore treats ads, images, counters, etc., as part of a running visit, and does not allow the hosts classified as ads, images, counters, etc., to "break" a running visit or spawn the creation of a new site visit. Lines that are generated from secure socket layer (SSL) traffic will also be included as part of the most recent site visit.

The method and system can create concurrently running site-visit sessions in the event a user has multiple browsers open. Web sites with frames can also be perceived as multiple visits with overlapping times if the frames are served from hosts belonging to different sites.

The method and system employ the following rules:
1. A new site visit will begin if the line includes a host that is a valid "site member" and:
    An open site visit is not already running for that site;
    The URL does not have a content type of "image" (e.g., .gif, .jpg, etc.); and
    The host is not classified as "forced content" (e.g., ads, banners, counters, etc.)
2. If the host is a site member of an "open" site visit and there are no intervening lines and less than five (5) minutes' time has passed, it will be included in the open site visit.
3. If the line contains a host that is a site member of an open site visit (Site "A"), but there have been one or more intervening lines, it will roll into the site visit from Site A if the following conditions are met:
    The intervening lines contain known (or classified) hosts and the elapsed time is less than/equal to five (5) seconds or
    The intervening lines have null host fields or contain only unknown hosts and the elapsed time is less than/equal to thirty (30) seconds.
4. Note that if the intervening lines contain a host that is a member of Site B, an overlapping site visit for Site B would start.
4. If the host field is not populated and the port number indicates a secure socket layer (SSL) transaction, then the line is rolled into the most-recent open site visit. Lines that contain any other port number with a null host field are ignored.
5. If the line contains a host that is not a member of any open site visit and the host is classified as "forced content" (e.g., ads, banners, counters, etc.), the line will roll into the most-recently created site visit.
6. If the line that contains a host that is not a member of an open site visit and the URL content type is defined as "image" (e.g., .gif, .jpg, etc.), it will roll into the most-recent site visit.

The level of greatest detail at which data is collected is referred to as a Collector Line, and contains all captured elements (user, times, bytes, port number, content types, etc.) from a single request from a server (e.g., a single .gif file on a Web site.) The Site Visits Table is an aggregate table that captures start time, end time, duration, and bytes for each intentional visit to a particular site.

In step 107, each Collector Line from step 105 is analyzed, and it is determined whether or not the host field of the Collector Line is populated. If not, then at step 113, the port number is analyzed to determine if an SSL transaction is indicated. If an SSL transaction is indicated, then at step 125, the current site visit is continued, and times are updated to include the new Collector Line. If an SSL transaction is not indicated, then, at step 127, the Collector Line is ignored, and the next Collector Line is analyzed.

If, in step 107, the host field is populated, then the host is checked against the Site Members Table in step 109 to determine if the host is a member of an open site visit. If so, a check is performed in step 117 to determine if there have been any intervening Collector Lines since the last line was added to this site visit. If not, the time interval between the time of the current Collector Line and the time that the last Collector Line was added to the site visit is analyzed in step 115. If the interval is less than or equal to an arbitrary but suitably large time interval, then, in step 125, the current site visit is continued, and times are updated to include the new Collector Line. If the interval is greater than the arbitrary but suitably large time interval, then a new site visit is created in step 129. In a preferred embodiment, the arbitrary but suitably large time interval is within the range of approximately zero to fifteen minutes. In a more preferred embodiment, the arbitrary but suitably large time interval is within the range of approximately zero to ten minutes. In the most preferred embodiment, the arbitrary but suitably large time interval is approximately five minutes.

If it is determined, in step 117, that there were intervening Collector Lines since the last line was added to this site visit, the time interval between the time of the current Collector Line and the time that the last Collector Line was added to the site visit is analyzed in step 121. If the time interval is less than or equal to an arbitrary but suitably small time interval, then, in step 125, the current site visit is continued, and times are updated to include the new Collector Line. If the time interval is greater than the arbitrary but suitably small time interval, then in step 123, the host is checked against the Host/URL Types Table to determine if the host is known or classified. In a preferred embodiment, the arbitrary but suitably small time interval is within the range of approximately zero to twenty seconds. In a more preferred embodiment, the arbitrary but suitably small time interval is within the range of approximately zero to ten seconds. In the most preferred embodiment, the arbitrary but suitably small time interval is approximately five seconds.

If, in step 123, the host is not known or classified, and the time interval is less than or equal to an arbitrary but suitably moderate time interval, then in step 125, the current site visit is continued, and times are updated to include the new Collector Line. If the host is known or classified or if the time interval is greater than the arbitrary but suitably moderate time interval, then in step 129, a new site visit is created. In a preferred embodiment, the arbitrary but suitably moderate time interval is within the range of approximately zero to sixty seconds. In a more preferred embodiment, the arbitrary but suitably moderate time interval is within the range of approximately zero to forty-five seconds. In the most preferred embodiment, the arbitrary but suitably moderate time interval is approximately thirty seconds.

In step 109, if the host is not a member of an open site visit, then the host and URL are checked in step 111 against the Host/URL Types Table to determine if they are classified as forced content, or if the URL is classified as an image. If so, then in step 125, the current site visit is continued, and times are updated to include the new Collector Line 125. If not, the host is checked against the Site Members Table in step 119, to determine if the host is a member of another site. If not, the Collector Line is ignored, and the next Collector Line is analyzed in step 127. If the host is a member of another site, then a new site visit is created in step 129.

The duration of a site visit is determined by subtracting the start time from the latest end time. Because the data lines are analyzed in order by start time, the latest end time may not be the last time received. For example, a request to a web server for a web page may involve multiple requests for different parts of the page. Specifically, one request line may have a start time of 10:02 a.m. and an end time of 10:05 a.m., and a second request line may have a start time of 10:03 a.m. and an end time of 10:04 a.m. Thus, the latest end times are used in the determination of the site visit duration.

There are two indicators used to determine when a site visit ends: when the end user closes the session, or there is an arbitrary but suitably large period of inactivity. The most preferred arbitrary but suitably large period of inactivity is fifteen minutes. When either of these indicators is present, all open site visits for the end user are closed.

The invention claimed is:

1. A method of collecting and classifying data about computer network traffic as user website visit recording sessions, comprising:
  reading a plurality of log entries, comprising data relating to network requests from a user and directed to a plurality of network servers;
  determining an open site visit based on the log entries, the open site visit being associated with one or more network servers of interest to which the user directed at least one request;
  reading an additional log entry relating to an additional network request from the user and directed to a network server different from the network servers of interest;
  determining that the additional log entry is part of a user ongoing interaction in the open site visit based on a determination that the additional log entry relates to forced content; and
  creating a record of the log entry as a continuation of the open site visit based on the determination that the additional log entry is part of the user ongoing interaction;
  wherein the method is performed by a computer system.

2. The method of claim 1, further comprising:
  assembling a data table made up of known hosts that direct a user to a specific website;
  collecting and classifying the computer network traffic corresponding to said sessions by tracking each user request to the known hosts for the specific website; and
  characterizing the network traffic for each website independent of which host is used by a user to request data from each website.

3. The method of claim 1, further comprising collecting and classifying computer network traffic for said sessions by concurrently running said sessions for each browser opened by users having multiple browsers open.

4. The method of claim 1, further comprising detecting and recording the port numbers of the additional log entry and determining whether the additional log entry indicates secure socket layer transactions.

5. The method of claim 1, further comprising determining the duration of the open site visit by subtracting the start time of a session for a user from the latest end time.

6. The method of claim 5, wherein the end of a the open site visit by a user is determined by detecting when the user closes a session.

7. The method of claim 5, wherein the end of a the open site visit is determined by detecting when a predetermined time interval of inactivity has elapsed.

8. The method of claim 1, wherein the determination that the additional log entry relates to forced content is based at least in part on matching a portion of the additional log entry against a table of hosts and/or URL types.

9. The method of claim 1, wherein the determination that the additional log entry relates to forced content comprises, at least in part, a determination that the additional log entry relates to a request for an image.

10. The method of claim 1, wherein the determination that the additional log entry relates to forced content comprises, at least in part, a determination that the additional log entry relates to a request for an advertisement, banner, or counter.

11. The method of claim 1, wherein the determination that the additional log entry relates to forced content is based at least in part on a table of hosts and URL types.

12. The method of claim 1, wherein the determination that the additional log entry relates to forced content is based at least in part on a host associated with the additional log entry.

13. A method of organizing content requests into session records, comprising:
  identifying a first content request generated by a user computing device, said content request directed to a first network location associated with a first network domain;
  associating the first content request with a first session;
  identifying a second content request generated by the user computing device, said second content request directed to a second network location associated with a second network domain;
  determining, based on the second network location, whether the second content request is a forced content request; and
  determining, when the second content request is determined to be a forced content request, to treat the second content request as part of said first session rather than as the start of a second session;
  said method performed in its entirety by a computer system.

14. The method of claim 13, wherein the first network domain is different from the second network domain.

15. The method of claim 13, wherein determining whether the second content request is a forced content request comprises matching a portion of the additional log entry against a table of hosts and/or URL types.

16. The method of claim 13, wherein determining whether the second content request is a forced content request comprises determining whether the additional log entry relates to a request for an image.

17. The method of claim 13, wherein determining whether the second content request is a forced content request comprises determining whether the additional log entry relates to a request for an advertisement, banner, or counter.

18. The method of claim 13, wherein the wherein determining whether the second content request is a forced content request comprises comparing a host associated with the additional log entry to a table of hosts and URL types.

* * * * *

UNITED STATES PATENT AND TRADEMARK OFFICE
CERTIFICATE OF CORRECTION

PATENT NO. : 7,991,901 B2
APPLICATION NO. : 12/415992
DATED : August 2, 2011
INVENTOR(S) : Tarquini et al.

It is certified that error appears in the above-identified patent and that said Letters Patent is hereby corrected as shown below:

At col. 3, line 28, before "Note" delete "4.".

At col. 5, line 48, in Claim 6, after "of" delete "a".

At col. 5, line 51, in Claim 7, after "of" delete "a".

At col. 6, line 50, in Claim 18, before "wherein" delete "wherein the".

Signed and Sealed this
Twenty-eighth Day of February, 2012

David J. Kappos
*Director of the United States Patent and Trademark Office*